United States Patent [19]

Randall et al.

[11] Patent Number: 4,598,128

[45] Date of Patent: Jul. 1, 1986

[54] POLYMER COMPOSITION AND PREPARATION METHOD

[75] Inventors: James C. Randall; William M. Whitte, both of Bartlesville, Okla.

[73] Assignee: Phillips Petroleum Company, Bartlesville, Okla.

[21] Appl. No.: 474,767

[22] Filed: Mar. 14, 1983

[51] Int. Cl.[4] .................. C08J 3/28; C08L 22/06; C08L 22/09

[52] U.S. Cl. .................. 525/240; 264/22; 522/112; 522/161

[58] Field of Search .................. 204/159.2; 525/240; 264/22

[56] References Cited

U.S. PATENT DOCUMENTS

| | | | |
|---|---|---|---|
| 2,878,174 | 3/1959 | Rainer | 204/154 |
| 3,563,870 | 2/1971 | Tung et al. | 204/159.2 |
| 3,567,607 | 3/1971 | Saunders et al. | 204/159.2 |
| 3,663,662 | 5/1972 | Cooke et al. | 525/240 |
| 3,700,759 | 10/1972 | Breuer et al. | 525/240 |
| 3,929,939 | 12/1975 | Salyer et al. | 525/240 |
| 4,205,021 | 5/1980 | Morita et al. | 525/240 |
| 4,303,710 | 12/1981 | Bollard et al. | 525/240 |
| 4,330,639 | 5/1982 | Matsuura et al. | 525/240 |
| 4,348,266 | 9/1982 | Coran et al. | 204/159.17 |
| 4,374,227 | 2/1983 | Michie, Jr. | 525/240 |
| 4,390,666 | 6/1983 | Moriguchi et al. | 525/240 |

OTHER PUBLICATIONS

Jacovic et al., Rheological Study of Long Branching in Polyethylene by Blending, Journal of App. Poly. Sci., 23, 517–527 (1979).

*Primary Examiner*—Allan M. Lieberman
*Attorney, Agent, or Firm*—French and Doescher

[57] ABSTRACT

An ethylene polymer composition is provided, the composition being a blend of a first ethylene polymer and a second ethylene polymer, the second ethylene polymer characterized by molecules having long chain Y-branches. The blend can be prepared by an extrusion process in which a portion of the polyethylene fed to the process is irradiated and the irradiated and non-irradiated polymers are blended by melt extrusion. The blends exhibit high flow activation energies and good blow-molding properties.

41 Claims, 3 Drawing Figures

STORAGE COMPLIANCE OF BLENDS SHIFTED TO 190 C
SUBSCRIPT r REFERS TO MULTIPLICATION BY T/463

DYNAMIC VISCOSITY OF BLENDS SHIFTED TO 190 C

LONG CHAIN BRANCHES/10,000 CARBON ATOMS
VARIATION OF VISCOSITY AND FLOW ACTIVATION ENERGY

POLYMER COMPOSITION AND PREPARATION METHOD

BACKGROUND OF THE INVENTION

This invention relates to novel polymer compositions. It further relates to methods for preparing the novel polymer compositions. In another aspect, the invention relates to a method of altering the flow activation energy properties of polyethylene.

Polyethylene is a commercially-important synthetic thermoplastic material. Its commercial importance is enhanced by increasing the variety of forms of polyethylene having different physical properties and different end use applications. For example, for blow-molding applications, it is desirable to use polyethylene resin which exhibits both good processability, e.g. a sufficiently low viscosity at an elevated temperature to permit extrusion in the melt, and sufficiently high viscosity at low shear rates to prevent distortion of the extruded parison prior to the blow-molding operation. In addition, it is desirable for certain applications, including blow-molding, to provide polyethylene which has a high flow activation energy, enabling significant changes in viscosity with small increases in temperature.

It is therefore an object of the invention to provide a novel ethylene polymer composition. It is a further object to provide a novel method for altering polymer properties. In one aspect, it is an object of the invention to provide polyethylene having low high-shear viscosity, high low-shear viscosity and high temperature sensitivity. In a further embodiment, it is an object of the invention to provide an improved blow-molding composition.

SUMMARY OF THE INVENTION

Figure 1:
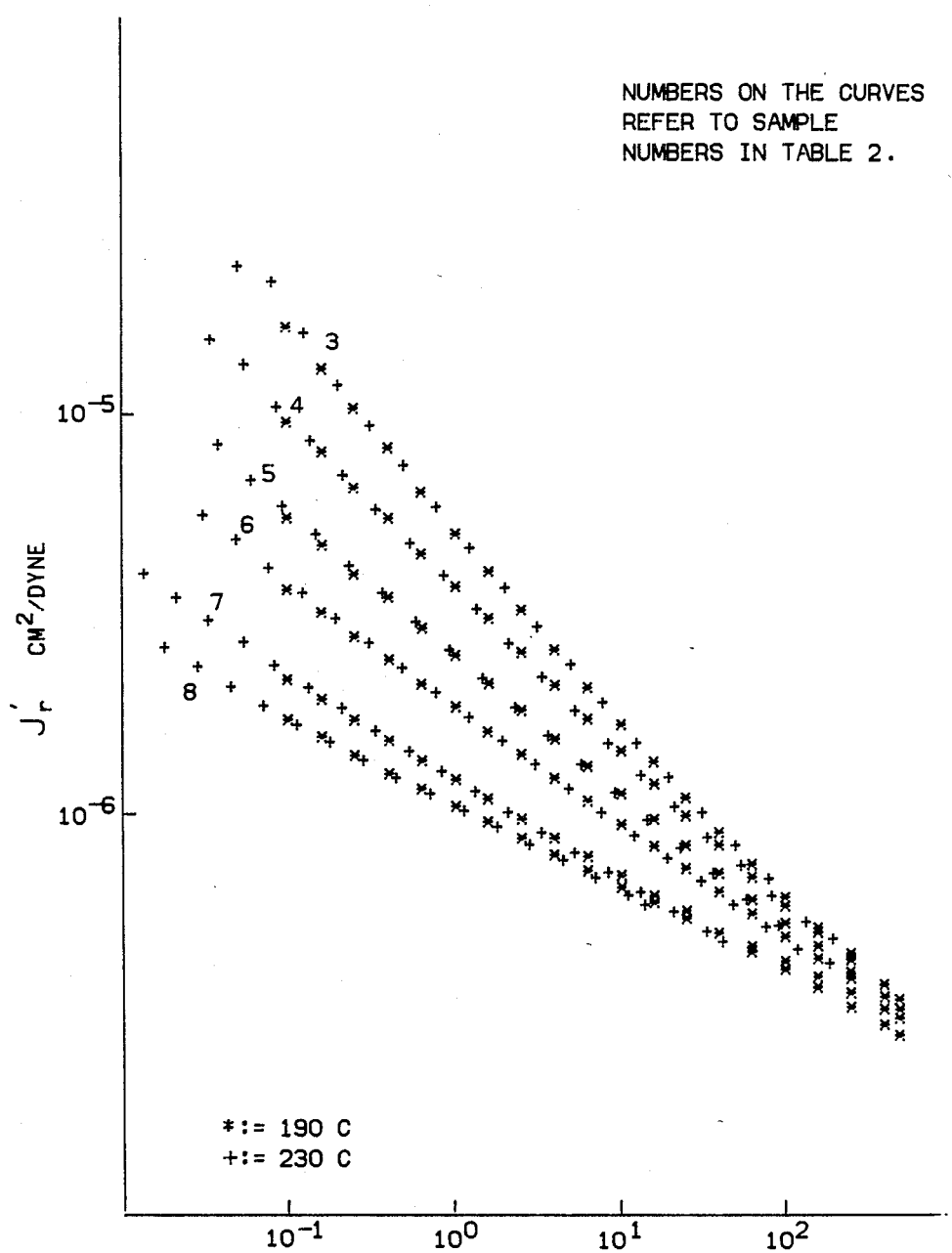
FIG. 1 is a graphical representation of rheological characteristics of certain of the invention solution recovered polymer blends.

According to the invention, an ethylene polymer composition is provided, the composition characterized by the presence of polymeric ethylene molecules having long chain Y-branching, as herein defined. The composition comprises a blend of a first ethylene polymer and a second ethylene polymer, the second of which exhibits the distinctive long chain branching. According to one embodiment, a first linear polyethylene and a second Y-branched polyethylene are blended to produce the compositions of the invention. Also according to the invention, a method is provided for in-situ production of the invention composition by exposure of less than 100% of a sample of polyethylene in the melt to radiation prior to or simultaneous with melt extrusion of the polymer. The blending of the Y-branched polymer in the polyethylene composition enables the production of polyethylene having good blow-molding properties, including enhanced temperature sensitivity and high low-shear viscosity, as compared with conventional high density polyethylene. The invention method enables the efficient production of blends of polyethylene containing a controlled amount of long chain branching.

DETAILED DESCRIPTION OF THE INVENTION

In one embodiment, the invention polyethylene composition comprises a first polyethylene and a second polyethylene, the second polyethylene containing long chain Y-branched molecules. The invention composition is derived from physically blending a selected polyethylene resin with a polyethylene resin having a distinctive molecular configuration marked by a long chain Y-branched structure.

As used herein, "ethylene polymer" refers to normally solid polymers comprising repeating units of the structure $—CH_2—$ and includes ethylene homopolymers and copolymers of ethylene and one or more $\alpha$-olefins having from three to about twenty carbon atoms. If the ethylene polymer is a copolymer, it is preferably random in monomer distribution and contains a total of up to about 20 mole percent of at least one comonomer. As used herein, the term "polymerization" encompasses copolymerization and "polymer" encompasses copolymer.

Polyethylenes of low to high crystallinity can be used. The majority of crystalline polyethylene is manufactured in one of two processes commonly described in terms of the pressure under which the polymerization reaction is carried out.

In the so-called "high pressure" process, the polymerization of ethylene is carried out at pressures of about 30,000 atmospheres in the presence of a suitable catalyst, such as a peroxide catalyst. The ethylene homopolymers produced in such a process are characterized by relatively low density and comprise molecules having both long chain and short chain branching. The majority of the end groups of the molecules are saturated. The short-chain branches are, in terms of number of carbon atoms, distributed along the polymer chain in essentially random fashion.

In the low pressure process, ethylene is polymerized under reactor pressures of about 500–600 psia to produce a polymer of relatively high density (greater than about 0.95) having molecules which can be generally described as linear with essentially no long chain branching. Low pressure polymerization catalysts include supported chromium and titanium-based catalyst systems. Polyethylene can be produced using supported chromium catalysts to yield predominately molecules having one vinyl end group per molecule, while polymer produced with titanium catalysts is formed predominately of molecules having saturated end groups.

The first ethylene polymer as above described is blended with a second ethylene polymer characterized by long chain Y-branched molecules to produce the invention composition. The second ethylene polymer is characterized by a detectable degree of long chain Y-branching and nonrandom, in terms of chain length, short chain branches ("nonrandom" including the essential absence of branches).

As used herein, the term "long chain branch" refers to a chain of sufficient length to affect the hydrodynamic volume of the polymer molecule. The term thus excludes methyl, ethyl, propyl, butyl, amyl, hexyl and somewhat longer groups extending from the polymer backbone, and these groups fall within the classification of "short chain branches." The presence of such short chains in a polymer as well as long chain branches of seven or more carbon atoms can be determined by C-13 NMR techniques, as described herein.

Branches of seven or more carbon atoms extend over branch lengths which are of medium length as well as truly long chain length, and further tests can be used to establish the presence of chains of sufficient length to change the hydrodynamic volume and significantly affect properties. One such test is the determination of the "g value" of the polymer. A g value of less than about 1 indicates long chain branching in polyethylene. It is a calculated value obtained from the expression $$g^{\frac{1}{2}} = \frac{[\eta]_{obs}}{[\eta]_{lin}}$$

wherein $\eta$lin is calculated from GPC data assuming the polymer to be linear. The same parameters used to determine $M_w$ and $M_n$ can also be used to determine $\eta_i$ through the Mark-Houwink equation and the $\omega_i$ values obtained from GPC. That is $\eta_{lin} = \Sigma \omega_i \eta_i$ where $\eta_i = \kappa M_i^\alpha$ and the $M_i$'s are established versus elution times by standard GPC calibration procedures. The term $\omega_i$ is simply the fractional weight of polymer with molecular weight i. The numerical value of $\kappa$ is $3.95 \times 10^{-4}$ and the numerical value of $\alpha$ is 0.729. In practice, the term $[\eta]_{obs}$ is obtained using a Ubbelohde viscometer with 0.015 weight percent solutions in trichlorobenzene at 130° C. and standard procedures. Further information on such procedures in provided in J. Appl. Polym. Sci. 21, 3331-3343 (1977), hereby incorporated by reference.

The long chain Y-branched polymer can be distinguished from ethylene polymer produced in the high pressure process at least by the relative scarcity in the former of short chain branches. High pressure, low density (HPLD) polyethylene is known to have up to about 30 long chain branches per 10,000 carbon atoms. However, the molecules of HPLD polyethylene can be expected to have in addition considerably more short chain branches, for example 100-150 per 10,000 carbon atoms. The high-pressure polymer short branches will be expected to exhibit a non-uniform or random length distribution. It is, in contrast to HPLD polyethylene, characteristic of one embodiment of the long chain Y-branched polymer to have relatively more long chain Y-branches than short chain branches. Such a polymer could have, for example, as few as 0 to about 10 short chain branches (having fewer than seven carbon atoms per branch) per 10,000 carbon atoms. By contrast, conventional ethylene polymers having significant long chain Y-branching can be expected to contain in addition a significant number of short chains of random length.

The long chain Y-branched polymers useful in the invention compositions can be prepared by a polymer irradiation process which produces an unusually high proportion of long chain Y-branches in relation to short chains. In such a process, a polymer comprising molecules having at least one vinyl end group per molecule is irradiated under non-gelling conditions in the absence of oxygen. Additionally, the treated polymer should have a sufficiently broad molecular weight distribution to produce an appreciable concentration of vinyl end groups in the treated polymeric material, for example, at least about 10 vinyl end groups per 10,000 carbon atoms. Ethylene polymers produced in a low pressure process using a supported chromium polymerization catalyst can be irradiated under suitable conditions to achieve the desired long chain branched molecular structure.

Ethylene polymers prepared using catalysts which inherently produce vinyl unsaturation in the end groups are highly suitable as starting materials for the irradiation induced Y-branches. Such polymers include Marlex ® polyethylene, a linear low pressure polymerization product of Phillips Petroleum Company.

Ethylene polymer prepared in processes which inherently produce molecules having predominately saturated end groups are also suitable as starting materials for the Y-branched polymers. End group vinyl unsaturation must be induced in such polymers prior to or during irradiation.

It has been found that heating an ethylene polymer under non-gelling, non-oxidizing conditions prior to irradiation is an effective method of producing terminal vinyl unsaturation in polyethylene having essentially no terminal vinyl unsaturation and of increasing terminal vinyl unsaturation in polyethylene which contains unsaturated end groups. The heat treatment includes heating the polymer in a non-oxidizing atmosphere at a temperature above the melting point of the polymer. The heating preferably is carried out in vacuo, as this permits the removal of residual oxygen and low molecular weight polymer fragments from the polymeric material. The heating is preferably sustained, with the time of treatment depending upon the particular polymer composition being treated and the extent of Y-branching desired in the final product. The time of heat treatment will be longer for polymers containing stabilizers such as antioxidants conventionally added during the recovery steps of many polymerization processes. For such stabilized polymer compositions, heat treatment over a time of about 16 to 36 hours would be expected to produce the desired result of vinyl end group formation. The presence of such stabilizers is thus contemplated, and may be preferred for control of the heat treatment time. It would be expected that, for a given degree of Y-branching desired in the final product, ethylene polymers which have vinyl end groups, such as those prepared in low pressure, supported chromium-catalyzed processes, would require less heating time than ethylene polymers having saturated end-groups.

The heating step is carried out under conditions which do not result in gellation of the polymer. Conditions to be avoided generally include excessive heat or excessively long heating times and the presence of oxygen during heating. A conventional test for "gellation" of polymers is insolubility in boiling xylene.

The polymer is heated to a temperature above its crystalline melting point, which will depend upon the polymer but will generally be greater than about 130° C. Heating and irradiation temperature will generally range from about 130° C. to about 300° C. Temperatures within about 200° C. to about 280° C. have been found highly suitable.

Following the heat treatment, the polymer can be irradiated under non-gelling, non-oxidizing conditions. The polymer can be irradiated in the solid state or in the melt, preferably the latter prior to cooling the polymeric material from the heat treatment temperature.

The irradiation can be carried out in an inert atmosphere such as nitrogen or argon or, preferably, in vacuo. The radiation dosage will vary depending upon the particular polymer being treated and the degree of Y-branching desired in the end polymer. The dosage must be at least that which is effective for bringing about structural changes in the molecules of the polymer melt and not so much as to result in gellation of the polymer, an indication of crosslinking of the molecules rather than the desired exclusive formation of long chain Y-branches. Suitable dosages of gamma irradiation fall generally within the range of about 0.1 to about 4 MRad, more usually about 1 MRad to to about 4 MRad; however, the proper dosage is a function of the state of the polymer treated, the properties of the polymer undergoing irradiation, and the nature of the desired end polymer, and can be determined empirically for a given ethylene starting and end polymer.

Any suitable source of high energy radiation, such as spent fuel elements from nuclear reactors, radioactive isotopes, cathode tubes and linear accelerators employing such as tungsten for the conversion of electrons to gamma rays, can be used in the invention process.

The irradiated polymer can be cooled gradually or rapidly. Quenching from the temperature of irradiation to about room temperature has been found to be a suitable cooling method.

Irradiation which produces long chain Y-branches in the treated ethylene polymer will generally produce a broadening of the molecular weight distribution of the polymer and a reduction in density, as compared with the starting polymer. Thus, this process enables, for example, the conversion of a high-density polymer to a medium-density polymer. For ethylene polymers prepared by processes which inherently produce vinyl end groups, formation of of the Y-branched polymer product is indicated by a decrease in vinyl unsaturation as compared with the starting material. A preferred irradiated polymeric product will be characterized by essentially no crosslinking, as indicated by complete solubility in boiling xylene.

The long chain Y-branched polymers useful in the invention have at least about 2, generally at least about 3 to about 40 long chain Y-branches per 10,000 carbon atoms. In one embodiment the ethylene homopolymer is characterized by relatively few short chains in comparison to long chains, generally no more than about 0 to about 10 short chains per 10,000 carbon atoms. Such long chain branched homopolymers can be properly described as having essentially no short chain branching. Such a degree of short chain branching would not be expected to affect measurable polymer properties to any appreciable extent.

In another embodiment of the second ethylene polymer, ethylene homopolymer comprises molecules having long chain Y-branches and a plurality of short chain branches having nonrandom branch lengths. That is, the short chain branches will be of substantially uniform length or, alternatively, exhibit a finite number of discrete chain lengths. The latter structure would be expected to be exhibited, for example, by an ethylene, 1-butylene, 1-hexene terpolymer produced according to the described process and containing long chain Y-branches, 2-carbon chains and 4-carbon chains.

Samples of such long chain Y-branched ethylene polymers produced according to the described process have been found to have a broad molecular weight distribution, low to medium density and viscous behavior suggestive of entanglement of long chain branches. Polymers can be produced in the process which have very low melt index (MI) values, for example less than about 0.05 g/10 min, as determined by ASTM D 1238, condition E. Such a melt index is unusual in a polyethylene having a weight average molecular weight of less than 500,000, and particularly less than 200,000. Polymers can also be produced having an intrinsic viscosity of less than about 3.0, as determined in a Ubbelohde viscometer with a 0.015 weight percent polymer solution at 130° C.

The invention polymer composition is useful for coatings and the production of shaped and molded articles for which strength, durability and light weight are desirable, such as pipes, gasoline tanks and other molded automobile parts.

The Y-branched molecules of the second polymer component of the invention are theorized to be the product of the attachment of a vinyl endgroup of one molecule or product of molecular scission to the backbone of another polymer molecule. This structure is thus distinguishable from the "H" structure of a crosslinked polymer. The polymer can also be characterized as a "long chain branched" polymer. Both terms for describing the molecular structure of the polymer will be understood by those skilled in the art of polymer preparation and characterization. Additional discussion of polymer molecular structure and methods of determining structure are provided in "Characterization of Long-Chain Branching in Polyethylenes Using High-Field Carbon-13 NMR," by J. C. Randall in ACS Symposium Series No. 142 (1980), the disclosure of which is hereby incorporated by reference.

The preferred compositions are prepared by blending a linear polyethylene with a second polyethylene having the distinctive Y-branching described herein. The second polyethylene can be derived from irradiation of the first polyethylene. This enables the modification of selected properties of the linear polyethylene, particularly melt viscosity and flow activation energy.

The high density polyethylene and the Y-branched polyethylene can be blended by any suitable method, and the method used can be selected to optimize the properties of the final blend. Suitable blending methods include solid, melt and solution blending techniques, including batch and continuous processes. Apparatus to accomplish this is well known and includes roll mills, Banbury mixers including batch and continuous types (and related types such as ribbon blenders and pug mills) and extruding devices including single and double screw machines. Special screws can be employed to aid mixing, for example Dulmage screws, by increasing shearing forces. However, increased shear results in increased temperatures and, if severe enough, some polymer degradation or alteration in polymer properties can occur. Sometimes the degradation can be eliminated or minimized by incorporating a suitable stabilizing system but such an approach can increase costs or result in undersirable polymer color or odor.

In solution blending, each component can be dissolved individually or in any combination in one or more solvents, generally at an elevated temperature that does not degrade the polymer. The solutions are then mixed to achieve a uniform composition. Since polymers may exhibit relatively low solubility, the polymer solutions will be relatively low in viscosity compared to molten polymer. Mixing of the polymer solutions can be accomplished under substantially less shear than in mixing molten polymers. This means that degradation is minimal and that, in principle, a much more uniform mixture is produced. On the other hand, the solvent must be removed in some fashion by evaporation, flashing, and the like. One method of removing the solvent is to pass the polymer "cement" through a devolatizing extruder where the solvent is removed under a partial vacuum through one or more vents along the extruder barrel. Another method is coagulation of the polymer in the cement with an alcohol followed by polymer recovery.

Extrusion of the blend in the melt is a preferred method of physical blending of the first and second polyethylenes on a commercial scale. For extrusion blending, solid polymer is mixed and heated to a temperature above the melting point. The melt can then be passed through an extruder, under a vacuum to prevent oxidative degradation of the molten polymer, and is then cooled and, optionally, pelletized.

According to one embodiment of the invention, a method is provided for producing in situ blends of high density polyethylene and irradiation-induced Y-branched polyethylene. High-density polyethylene, preferably in pellet or powder form, is heated to a non-gelling temperature above the melting point for a time sufficient to produce some degree of polymer chain degradation. The polymer, still at an elevated temperature, is passed through an extruder under vacuum conditions. The heated, non-gelled polymer is exposed to radiation pulses or pulsed electron beams for example, so as to produce localized sites of Y-branched polyethylene. The linear and Y-branched polyethylene can then be blended by passing the thus-treated polyethylene containing localized Y-branched sites through an extruder or a series of extruders under non-oxidizing, preferably vacuum conditions. The extruded product is cooled and, optionally, pelletized. Exposure to the radiation preferably occurs just prior to or during extrusion. The radiation level, duration of pulse and starting polymer properties can be controlled within the parameters described above for preparation of the Y-branched polymer to produce a final desired polymer having preselected properties such as flow activation energy.

The incorporation of the second polymer component into the high density polyethylene first polymer component enables the adjustment of the shear viscosity of the blend. As shown in Example 3, the viscosity of the invention blends at high shear rates is very low, and thus the blends are suitable for extrusion molding-type applications. For a given molecular weight, the viscosity of the blends at low shear rates is higher than that for high density polyethylene, thus making it suitable for blow-molding applications.

The alteration of the rheological properties without increasing significantly the molecular weight is a major advantage of the invention blends, which provide low viscosity at low shear rates and good hanging strength. Similar properties can be obtained by severe extrusion of polyethylene; however, this process has undesirable effects on polymer properties such as oxidation of the polymer and decreased color quality. The degree of desirable property alteration achieved by severe extrusion is not as great as that obtained by the invention process. In addition, severe extrusion is an energy-intensive process which would generally not be economical on a commercial scale.

It has been found that the second polymeric component has an unusually large flow activation energy ($E^*$), indicating that relatively small temperature changes are effective in producing large changes in polymer viscosity. It has also been found that this relative temperature sensitivity is imparted to blends of the second component with the first polyethylene component of the blend. For example, the flow activation energy of low density polyethylene is generally in the range of about 10–20 kcal/mole (for high density, about 6–9 kcal/mole), while the activation energies for the blends and the pure Y-branched polymer range up to about 40 kcal/mole.

The blending of high density polyethylene in this manner thus provides a method of increasing its viscosity at low shear and its activation energy, thereby improving its utility as a blow-molding resin. It is believed that long-chain Y-branches contribute to this temperature sensitivity of the second component; however, the second component is able, for a given molecular weight and number of long-chain Y-branches, to impart a significantly greater increase in activation energy ($E^*$) than would be expected from previous studies with any polyethylene.

The blending of the Y-branched polyethylene with high density polyethylene also enables the production of blends which will retain the desirable stiffness properties of high density polyethylene with the good flow properties and high $E^*$ shown in Example 3.

The determination of the number of long chain branches in an ethylene polymer can be accomplished by, for example, C-13 NMR methods as described by Randall.

In this method, quantitative characterization of polyethylenes utilizing carbon-13 NMR following irradiation and/or heat treatment is based on the appearance of new resonances associated with the formation of either short or long chain branches or the change in old resonances associated with end groups, branches, internal double bonds and oxygenated species. Each structural entity gives rise to an array of resonances; the choice of a particular resonance for quantitative purposes will depend upon overlap with other arrays or the proximity to very strong resonances which create a baseline effect or an unwanted intensity contribution. The carbons used for identification and quantitative measurements along with respective carbon-13 NMR chemical shifts in ppm from an internal TMS (tetramethylsilane) standard are listed below. Only the resonances in the 0–50 ppm region are given.

Chemical Shifts of Structural Entities Found In Polyethylene

Saturated End Groups

—$CH_2$—$CH_2$—$CH_3$
　32.17　22.85　14.05
　3s　　2s　　1s

Vinyl End Groups

—$CH_2$—$CH$=$CH_2$
　33.89
　a

-continued
Chemical Shifts of Structural Entities Found In Polyethylene

Cis Double Bonds

$$-CH_2 \overset{CH=CH}{\diagup\diagdown} CH_2-$$

27.45   $a_c$
$a_c$

Trans Double Bonds

$$a_t \overset{-CH_2}{\diagdown} CH=CH \overset{}{\diagdown} CH_2-$$

32.52

Hydroperoxide Groups

$$\overset{\beta}{-CH_2}-\overset{\alpha}{CH_2}\overset{}{CH}-\overset{\alpha}{CH_2}-\overset{\beta}{CH_2}-$$
$$\quad\quad\quad\quad\quad |$$
$$\quad\quad\quad\quad\quad O\ \ 33.14\quad 26.83$$
$$\quad\quad\quad\quad\quad |$$
$$\quad\quad\quad\quad\quad O$$
$$\quad\quad\quad\quad\quad |$$
$$\quad\quad\quad\quad\quad H$$

Carbonyl Groups

$$\overset{\beta}{-CH_2}-\overset{\alpha}{CH_2}-\underset{\underset{O}{\|}}{C}-\overset{\alpha}{CH_2}-\overset{\beta}{CH_2}-$$

42.83    24.31

Ethyl Branches

39.68
$$\overset{\gamma}{-CH_2}-\overset{\beta}{CH_2}-\overset{\alpha}{CH_2}-\overset{\downarrow}{CH}-\overset{\alpha}{CH_2}-\overset{\beta}{CH_2}-\overset{\gamma}{CH_2}$$
30.47  27.30  34.06   |        ← 26.74
                    CH$_2$
                     |
                    CH$_3$
                    ↑ 11.18

Butyl Branches

38.15
$$\overset{\gamma}{-CH_2}-\overset{\beta}{CH_2}-\overset{\alpha}{CH_2}-\overset{\downarrow}{CH}-\overset{\alpha}{CH_2}-\overset{\beta}{CH_2}-\overset{\gamma}{CH_2}$$
30.47  27.30  34.55    |       34.17
                     CH$_2$
                      |
                     CH$_2$   ← 29.51
                      |
                     CH$_2$   ← 23.36
                      |
                     CH$_3$   ← 14.09

Long-Chain Branches

38.19
$$\overset{\gamma}{-CH_2}-\overset{\beta}{CH_2}-\overset{\alpha}{CH_2}-\overset{\downarrow}{CH}-\overset{\alpha}{CH_2}-\overset{\beta}{CH_2}-\overset{\gamma}{CH_2}$$
$\alpha$ CH$_2$ ← 34.55
$\beta$ CH$_2$ ← 27.30
$\gamma$ CH$_2$ ← 30.47

Recurring Methylene

$-(CH_2)_n-$
↑
29.98

$\delta + \delta +$

---

Chemical Shifts of the "H" Type of Crosslink in Polyethylene 39.49
$$\overset{\gamma}{-CH_2}-\overset{\beta}{CH_2}-\overset{\alpha}{CH_2}-\overset{\downarrow}{CH}-\overset{\alpha}{CH_2}-\overset{\beta}{CH_2}-\overset{\gamma}{CH_2}$$
$$\quad\quad\quad\quad\quad\quad\quad\quad |$$
$$-CH_2-CH_2-CH_2-CH-CH_2-CH_2-CH_2$$
$\gamma$   $\beta$   $\alpha$   $\alpha$   $\beta$   $\gamma$
30.70  28.22  30.19

R. L. Bennett, A. Keller, J. Stejny and M. Murray, J. Polym. Sci., Polym. Phys. Ed., 14, 3027(1976).

The concentration in structural units per 10,000 carbon atoms is determined by dividing the representative intensity of a resonance for one carbon atom from a particular structural unit array by the total carbon intensity, TCI, of a given spectrum and then multiplied by 10,000. Generally, the TCI term will be dominated by the $\delta^+ \delta^+$ intensity, which is usually set at 30,000. (Note that $I_x$ is the peak height observed at "x" ppm). Structural unit definitions are provided below for NBS 1475 ethylene polymer (See FIGS. 1-5).

TCI = $\delta^+\delta^+$ + 9B$_2$ + LCB + 3(s + a) + 4(a$_c$ + a$_t$) + 5(C=O) + 5(CH—OOH)

B$_2$ = a single carbon resonance intensity associated with the array of ethyl group resonances; the typical choice is ($\frac{1}{2}$)I$_{34.06}$. When appropriate, an average of several resonances may be used.

LCB = a single carbon resonance intensity associated with the array of resonances from long chain branching. ($\frac{1}{2}$)I$_{34.55}$ is normally used.

s = a single carbon resonance intensity associated with the saturated end group resonances. The usual choice is 2s at 22.85 ppm.

a = a single carbon resonance intensity associated with the array of resonances from terminal vinyl groups. Only one resonance at 33.89 ppm is found in the 0-50 ppm range, which is the region normally used for quantitative measurements.

a$_c$,a$_t$ = the allylic carbon resonance intensity for cis (27.45 ppm) and trans (32.52 ppm) internal double bonds. The one carbon intensity will be ($\frac{1}{2}$)I$_{27.45}$ and ($\frac{1}{2}$)I$_{32.52}$, respectively, for a$_c$ and a$_t$.

C=O = the single carbon intensity for the array of resonances associated with carbonyl groups. ($\frac{1}{2}$)I$_{42.83}$ is normally used.

CH—OOH = the single carbon intensity for the array of resonances associated with hydroperoxide groups. The usual choice is ($\frac{1}{2}$)I$_{33.14}$.

$\delta^+\delta^+$ = the peak height of the 29.98 ppm resonance for $-(CH_2)_n-$, the major, recurring methylene resonance. All other listed peak heights are relative to $\delta^+\delta^+$, which is determined by -continued Chemical Shifts of the "H" Type of Crosslink in Polyethylene defining the vertical scale during spectral printout. A typical value for polyethylene measurements is 30,000.

The particular definition for TCI will vary from one polyethylene to another depending upon the structural units present. Often, an α-olefin is added deliberately to produce a short chain branch of a specific length. Sometimes a particular catalyst system will produce unplanned branches or only certain types of end groups which have to be considered when defining the total carbon intensity. The number and types of oxygenated species as well as cis and trans double bonds will also vary as will the intrinsic amount of long chain branching. the amount of these "unplanned" structural units (and end units) is generally very small and contribute, at most and collectively, about 1% to the value of TCI in high density polyethylenes. What is by far the most important consideration is an accurate assessment of the relative amounts of the various structural species present in polyethylenes. For this reason, it is best to select well-isolated resonances with similar line-widths for quantitative measurements. In the previous definitions, only α carbons and allylic carbons were recommended for peak height measurements. It was also observed that "2s" had the best line width for comparison purposes. Until accurate relative intensity measurements (integrated peak intensities) can be made under these dynamic range conditions, peak heights afford the most reliable and reproducible approach.

Carbon-13 NMR quantitative determinations can be made as follows:

Long Chain Branches/10,000 carbons = (LCB/TCI) × $10^4$
Saturated End Groups/10,000 carbons = (s/TCI) × $10^4$
Vinyl End Groups/10,000 carbons = (a/TCI) × $10^4$
Cis Double Bonds/10,000 carbons = ($a_c$/TCI) × $10^4$
Trans Double Bonds/10,000 carbons = ($a_t$/TCI) × $10^4$
Carbonyl Groups/10,000 carbons = (C=O/TCI) × $10^4$
Hydroperoxide Groups/10,000 carbons = (CH—OOH/TCI) × $10^4$
Ethyl Branches/10,000 carbons = ($B_2$/TCI) × $10^4$ In general, C-13 NMR spectra of the long chain Y-branched ethylene polymers which have been produced by the invention heat/irradiation process are characterized by the presence of an array of α(34.55), β(27.30), Y(30.47) and methane (38.19) resonances which are in proportion to the amount of long chain branching present.

Figure 3:
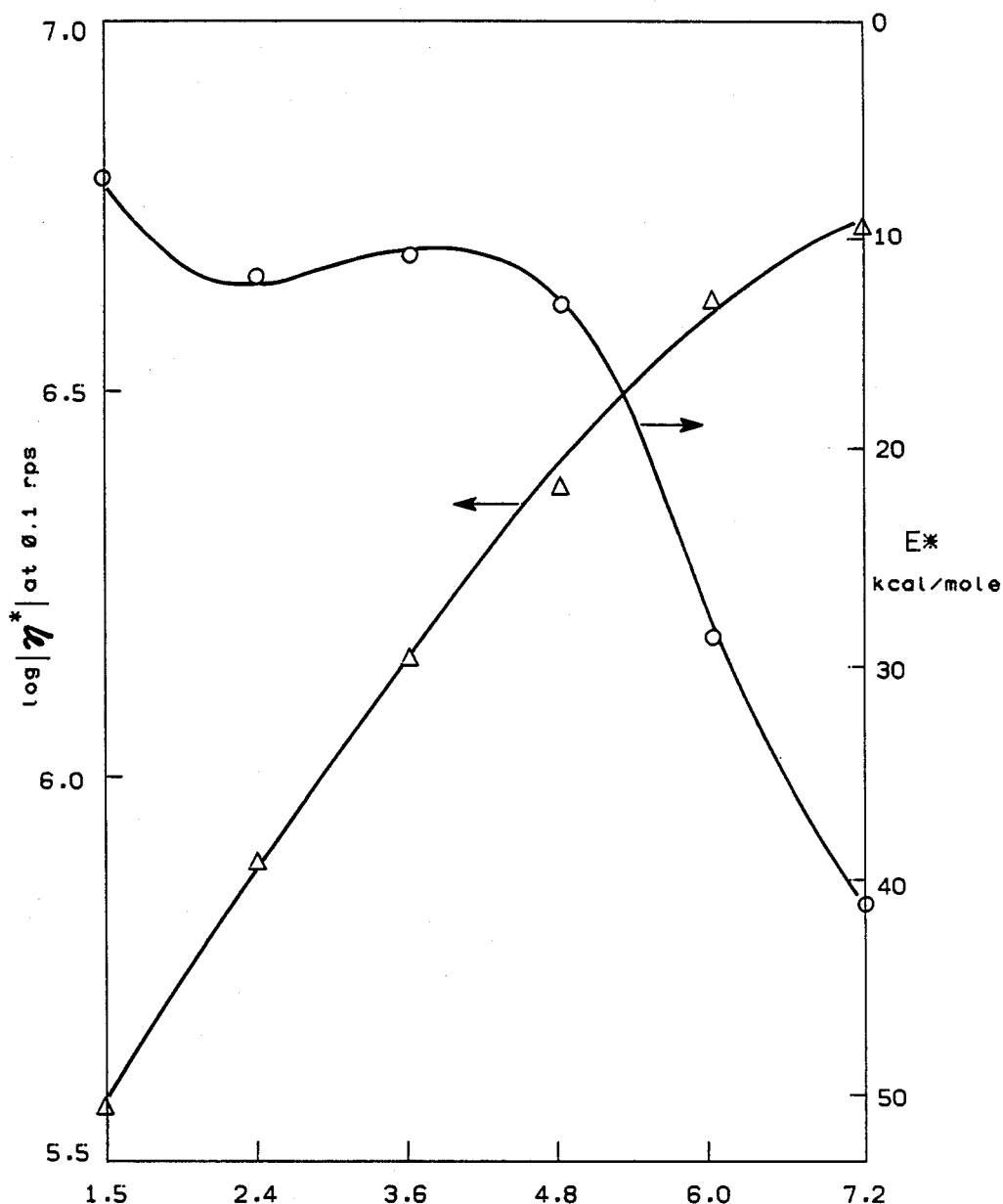
FIG. 3 is a graphical representation of viscosity and activation energy versus number of long-chain Y-branches per 10,000 carbon atoms in the invention blends containing various levels of radiation-induced long-chain Y-branches.

As shown in FIG. 3 and the table below, the invention blends exhibit an unusually high flow activation energy for a given molecular weight and number of long chain Y-branches. Low density polyethylene typically is characterized by as many as about 30 long chain branches per 10,000 carbon atoms and E* of about 10–19 kcal/mole. Low pressure, high density polyethylene of the same molecular weight will have about 1 long chain branch per 10,000 carbon atoms and E* of about 9. Blending the long chain Y-branched ethylene polymer has been found to increase the E* to levels much higher than would previously have been expected from the degree of long chain branching present in the blend.

As shown also in FIG. 3, there exists a series of blends of high density polyethylene and Y-branched polyethylene in which E* does not change with a change in the number of long chain branches present in the composition. Thus, for those blends having from about 18 to about 60 weight percent of the Y-branched component, based on the weight of the blend, the number of Y-branches (calculated) in the blend varies from about 5 to about 2, while E* for the blends remains at a constant level of about 12. This E* is striking considering that, even with a long chain branch number of 30, the high pressure, low density polyethylene maximum is approximately equal to the E* possible with a much lower (about 2–5) level of long chain branching in this series of blends. Thus, as can be seen from FIG. 3, within the invention blends there appears to be a range of long chain branch concentrations within which sensitivity to temperature remains relatively constant and very high, while the overall viscosity changes smoothly with long chain branching. By blending the Y-branched polymer with high density polyethylene, it is possible to maintain and even increase the E* of the high density polyethylene, without a significant increase in weight average molecular weight.

EXAMPLE I

Examples 1 and 2 describe the second ethylene polymer component of the invention blends.

A series of runs was made as described below employing a linear ethylene homopolymer designated as National Bureau of Standards Material 1475. The polymer, as received, has a density of 0.9874 g/cm³ as determined in accordance with ASTM D1505, a melt index (MI) of 2.07 g/10 min. as determined in accordance with ASTM D1238 (Condition E) and an average of about 5.6 terminal vinyl groups per 10,000 carbon atoms as determined by means of high-field carbon-13 nuclear magnetic resonance (NMR) measurements (later described). The polymer is available from E. I. duPont de Nemours and Company, Wilmington, Del., and is stabilized by the producer with 111 ppm of the antioxidant tetrakis[methylene-3(3',5'-dit-butyl-4'-hydroxyphenyl)-propionate]methane (Irganox ®1010, Ciba-Geigy). A sample of the polymer weighing about 20 to 25 g was employed in each run. Generally, the sample was degassed for 24 hours at the same temperature to be employed for any subsequent irradiation, e.g. 24 hours at either 300° K. or about 500°–550° K. The irradiation was conducted in vacuo, unless specified otherwise, employing a 25,000 curie cobalt-60 source. With this source, a 1 MRad dosage level required one hour of irradiation.

The structural features associated with each polymer sample, before and after the specified treatment were determined by means of carbon-13 NMR measurements employing a Varian XL-200 NMR spectrometer at 50.3 MHz. The samples to be measured were dissolved in 1,2,4-trichlorobenzene at 15 weight percent and maintained under a nitrogen atmosphere at 398° K. during the measurements. The nomenclature used in the following tables is that established by J. C. Randall, "Polymer Characterization by ESR and NMR", edited by A. E. Underwood and F. A. Bovey, ACS Symposium Series No. 142, American Chemical Society, Washington, D.C., 1980, 93–118.

The number average molecular weight ($M_n$) and weight average molecular weight ($M_w$) determinations were made with either a Waters 150C gel permeation chromatograph (GPC) using 4 porous silica columns: two SE 4000, one Se 500 and one PSM 605, available from DuPont or/and low angle laser light scattering (LALLS) measurements with a Chromatix KMX-6 unit coupled to a DuPont Model 870 size exclusion chromatograph (SEC) using the same column set as that employed in the Waters unit.

The results are summarized in Table 1.

TABLE 1

| | Treatment Afforded NBS 1475 Polyethylene | | | | |
|---|---|---|---|---|---|
| | Run No. | | | | |
| | 1 | 2<br>Heated In Vacuo | 3 | 4 | 5 |
| | | | Irradiation, 298° K.*, In Vacuum | | |
| Structural Entities<br>per $10^4$ Carbon Atoms | Before<br>Irradiation<br>Control | 24 Hrs. @ 500° K.<br>3 MRad<br>Invention | 2.0<br>MRad | 4.0<br>MRad<br>Comparison | 8.0**<br>MRad |
| $-CH_2CH_2CH_3$ | 10.4 | 103.5 | 13.0 | 12.9 | 15.1 |
| $-CH_2CH=CH_2$ | 5.3 | 15.5 | 2.0 | 2.7 | — |
| Long Chain "Y" Branches | 0.8 | 34.2 | 0.8 | 1.4 | — |
| Cis $\overset{C=C}{\underset{H}{|}\phantom{=}\underset{H}{\diagdown}}$ | 2.5 | 9.1 | 2.7 | 2.8 | — |
| Trans $\overset{\phantom{=}\overset{H}{\diagup}}{\underset{H}{\diagup}C=C}$ | 1.9 | 4.4 | 2.0 | 2.7 | 5.8 |
| Ethyl Branches | 2.3 | 3.9 | 2.1 | 2.4 | — |
| CH—COOH | 2.2 | 2.9 | 2.3 | 2.4 | 4.9 |
| C=O | — | 1.5 | 1.9 | 1.7 | 3.1 |
| $M_w \times 10^{-3}$ | 52.8 | 35.8 | 116 | 128 | |
| $M_n \times 1^{-3}$ | 18.1 | 5.5 | 21.8 | 22.3 | |
| $M_w/M_n$ | 2.9 | 6.5 | 5.3 | 5.7 | |

Notes:
*Room temperature
*Sample partially Gelled; observed soluble component only The structural entities of the polyethylene before irradiation or/and heating, which present a baseline for comparison purposes, are detailed in run 1. The untreated polymer, for example, contained per 10,000 carbon atoms, about 13 saturated terminal groups, about 5.5 terminal vinyl groups, about 0.8 long chain "Y" branches, about 2 ethyl branches, a $M_n$ of about 18,000 and a $M_w$ of about 53,000 to provide a molecular weight distribution, of 2.9 $M_w/M_n$. Runs 3, 4, 5 indicate that irradiating solid polyethylene to a dosage from 2 to less than 8M Rad (just short of the gel point) leads only to a small increase in the number of long chain branches. This amount of branching, however, is associated with a pronounced effect on the weight average molecular weight, which changed from about 53,000 to about 116,000 in run 3 to about 128,000 in run 4. At the same time a moderate increase in number average molecular weight is noted, the effects of the increased weight average and number averaged molecular weights giving rise to a broadened molecular weight distribution relative to the control polymer. An increase in saturated terminal groups and a decrease in terminal vinyl groups along with the increase in the molecular weight is consistent with a mechanism suggesting that branching or end linking is the dominant reaction in the solid state irradiation of the polymer under the conditions employed. Chain scission appears to play only a minor role under these moderate temperature conditions.

However, when the polymer is thermally degraded in a vacuo for 24 hours at about 550° K. followed by irradiation of the molten product at that temperature with a 3M Rad dosage as in invention run 2, it is apparent that striking changes have occurred relative to control run 1. The number of saturated terminal groups has increased about an order of magnitude, the number of terminal vinyl groups has nearly tripled, the number of ethyl branches shows only a nominal increase, the number of cis and trans internal double bonds also showed only nominal increases especially when compared to the increase in long chain branching, which changed dramatically from about 1 to about 34 per 10,000 carbon atoms. Simultaneously the polymer produced is substantially lower in weight average and number average molecular weights while the molecular weight distribution has increased about 2.2 times. These results are consistent with a process which initially thermally degraded the polymer involving chain scission, the fragments being reconstituted by irradiation to produce a polymer having many long chain "Y" branches. The reconstitution reaction may involve "end-linking: or grafting of the fragments. On the other hand, the effect on short chain branches is relatively minor.

EXAMPLE 2

A series of runs was made somewhat similar to those described in the first example employing as the ethylene polymer in ethylene homopolymer prepared with a supported chromium oxide catalyst. The polyethylene is commercially available as Marlex ®6003 from Phillips Petroleum Company, Bartlesville, Okla. It is a linear polyethylene having a nominal density of 0.963 g/cm³, a nominal melt index of 0.35 g/10 min. and an average of about 9.2 terminal vinyl groups per 10,000 carbon atoms. The polymer was stabilized with 300 ppm of 2,6-di-t-butyl-4-methylphenol, 400 ppm of dilaurylthiodipropionate and 100 ppm of calcium stearate. Each polymer sample, about 20–25 g, was degassed in vacuo and irradiated in vacuo or in air. The structural features and molecular weights of the initial polymer, the products made, and conditions employed are detailed in Table 2.

TABLE 2

Treatment Afforded Polyethylene Produced With Cr—Based Catalyst

| Structural Entities per 10⁴ Carbon Atoms | Run No. 6 Before Irradiation Control | 7 Heated In vacuo for 24 hours @ 550° K. Comparison | 8 Heated In Vacuo for 24 hours @ 550° K. 1 MRad @ 550° K. Invention | 9 2 MRad In vacuo @ 298° K. Comparison | 10 4 MRad In Air @ 298° K. Control |
|---|---|---|---|---|---|
| —CH$_2$—CH$_2$—CH$_3$ | 7.3 | 18.6 | 18.6 | 8.6 | 10.1 |
| —CH$_2$—CH=CH | 7.8 | 14.8 | 9.4 | 3.9 | 4.1 |
| Long Chain "Y" Branches | 1.5 | 4.4 | 7.2 | 2.6 | 1.1 |
| Cis $\begin{array}{c} C=C \\ H \phantom{=} H \end{array}$ | 2.2 | 3.5 | 2.7 | 3.7 | 4.0 |
| Trans $\begin{array}{c} H \\ C=C \\ H \end{array}$ | 1.6 | 2.6 | 2.6 | 3.3 | 3.8 |
| Ethyl Branches | 2.2 | 2.2 | 1.7 | 2.5 | — |
| Butyl Branches | — | 2.6 | 3.0 | — | — |
| CH—COOH (Hydroperoxide) | 1.6 | 2.2 | 2.1 | 3.3 | 3.9 |
| C=O | 0.7 | — | — | — | 1.7 |
| M$_w$ × 10$^{-3}$ | 140 | 166 | 192 | 164 | 58.3 |
| M$_n$ × 10$^{-3}$ | 20 | 13.1 | 14.8 | — | — |
| M$_w$/M$_n$ | 7.0 | 12.4 | 12.9 | ≧7.4 | ≧3.6 |

The results in Table 2 demonstrate the changes in the structural entities of a polyethylene produced in the presence of a supported chromium oxide catalyst due to thermal degradation alone in vacuo (comparison run 7) thermally degraded polymer subsequently irradiated in the melt state (invention run 8), polymer irradiated in a vacuum at room temperature (comparison run 9) and polymer irradiated at room temperature in air (control run 10).

In comparing the structural entities and molecular weights of the untreated polymer in control run 6 with the same properties obtained with the polymer irradiated in air with 4MRad at room temperature in control run 12 it is evident that the irradiated polymer has undergone extensive degradation, e.g. chain scission, since the weight average molecular weight has decreased about 58 percent and the number average molecular weight has declined about 25 percent. The number of terminal vinyl groups and long chain branches have also declined while the internal cis and trans groups have increased. As expected, the number of hydroperoxide and carbonyl groups have also increased. This behavior is consistent with a degradation process conducted in air.

In comparing the properties of thermally degraded polymer produced in a vacuum in comparison run 7, with the untreated polymer of control run 6, it is evident that the thermal degradation process alone is capable of substantially increasing the number of terminal vinyl groups and long chain branches associated with some chain scission is occuring followed by recombining of the fragmented chains into longer chains containing long chains and butyl branches.

Invention run 8 illustrates the effects of superimposing irradiation of the polymer produced in a vacuo in run 7, respectively. The effects of conducting the irradiation at a high temperature, e.g. 550° K., on the thermally degraded polymer are shown in run 8. In relating the properties of the thermally degraded polymer of run 7 with those of invention run 8 it is apparent that the irradiation is speeding the recombination of the polymer fragments to give a higher molecular weight polymer based on weight average molecular weight containing more long chain branches. The number of long chain branches is substantially increased in invention run 8. Concommittently, the number of terminal vinyl groups is declining, consistent with a process in which end-linking of polymer fragments containing terminal vinyl groups is being expedited by irradiation.

In viewing the results of the examples taken together it is evident that the key to producing long chain branches in a polymer is related to the number of terminal vinyl groups per 10,000 carbons associated with the initial polymer. Polymers inherently containing sufficient terminal vinyl groups to be improved by irradiation short of the gel point in a vacuum are those produced by contact with a supported chromium oxide catalyst such as those of U.S. Pat. No. 2,825,721 (Hogan and Banks). It is desirable, however, that such polymers first undergo a thermal degradation step in an inert atmosphere such as argon, nitrogen, etc., or in a vacuum to increase the number of terminal vinyl groups to enhance the effects of the irradiation process.

EXAMPLE 3

A series of polymer solutions was prepared from a Y-branched ethylene polymer containing about 7 long chain branches per 10,000 C atoms and a conventional high density ethylene polymer containing about 1 to 1.5 long chain branches per 10,000 carbon atoms. Each solution was made by dissolving 4 g (total) of the polymer(s) in 150 mL (131 g) of 1,2,4-trimethylbenzene at 140° C. employing stirring or shaking to aid the dissolution. Each solution contained about 3 weight percent polymer. The polymer was subsequently recovered as a precipitate by pouring the solution into about 1 L of cold methanol. About 500 mL of additional methanol was added, the mixture was filtered to remove the precipitate and the precipitate was washed several times with portions of methanol. Solvent was removed by drying each washed precipitate at 80° C. in a vacuum oven for 1 to 2 hours. Each dried sample was then stabilized by slurrying it in sufficient acetone solution containing 0.01 g of 2,6-di-t-butyl-4-methylphenol to obtain a polymer containing about 0.1 weight percent stabilizer based on the dried mixture. Solvent was removed as before by employing a vacuum oven at 80° C., then additionally heated in a vacuum oven at 110°—110° C. for 4 hours.

Molecular weights of the samples were measured by low angle laser light scattering (LALLS). The LALLS unit, (Chromatrix KMX-6) was located between a size exclusion chromatography unit (DuPont 830) and its infrared detector. Intrinsic viscosities were determined in 1,2,4-trichlorobenzene at 130° C., measured on a Schott Autoviscometer and Ubbelohde $0_c$ viscometer. $^{13}$C-NMR spectra were obtained with a Varian XL-200 at 125° C. as described in copending application Ser. No. 419,248, filed Sept. 17, 1982. The polymers were dissolved as 15 weight percent solutions in 1,2,4-trichlorobenzene.

The LCB concentration in the various samples was determined by $^{13}$C-NMR as described in the copending application.

The physical properties of the starting polymers and blends thereof are set forth in Table 3.

TABLE 3

PHYSICAL PROPERTIES OF SOLUTION BLENDED Y-BRANCHED AND LINEAR HDPE

| Sample No. | Weight, Percent Y-Branch | Weight, Percent HDPE | Molecular Weights LALLS $M_W \times 10^{-3}$ | Intrinsic Viscosity dL/g | Calculated LCB per 10,000 C atoms |
|---|---|---|---|---|---|
| 1 | 100 | 0 | 165 | 2.08 | 7.2 |
| 2 | 80 | 20 | 155 | 1.97 | 6.0 |
| 3 | 60 | 40 | 155 | 1.94 | 4.8 |
| 4 | 40 | 60 | 175 | 1.84 | 3.6 |
| 5 | 20 | 80 | 160 | 1.84 | 2.4 |
| 6 | 0 | 100 | 140 | 1.78 | 1.5 |

NOTES:
HDPE is high density polyethylene having a nominal density of 0.963 g/cc as determined by ASTM D1505 and a nominal melt index of 0.3 g/10 minutes as determined by ASTM D1238, Condition E.
Y-branched ethylene polymer was made by irradiating a sample of the HDPE with a 25,000 Curie, cobalt 60 source in the absence of oxygen to just short of the gel point as described in the copending application.

The calculated value obtained for long chain branching in sample 1 is 7.2. Due to the $^{13}$C-NMR peak height measuring techniques used, the value could be as low as about 4, but would not be greater than 7.2.

The results in Table 3 for samples 1, 6 give the molecular weights, intrinsic viscosities and LCB for each starting material. Blends of the two components have intermediate structural features as expected.

EXAMPLE 4

Dynamic shear rheological tests were performed on the samples given in Table 3 as well as on each starting component not put into solution, with a Rheometrics Dynamic Spectrometer (RDS) using parallel plate geometry at 190° C. and 230° C. Strain amplitude was 5%, nitrogen gas was used in the sample chamber at all times, and oscillatory frequency was varied from 0.1 to 500 radians/second. The data obtained give storage modulus (G') and loss modulus (G") as a function of oscillatory frequency ($\omega$). From those data in, turn can, be calculated storage compliance (J'), loss compliance (J") and dynamic complex viscosity $/\eta^*/$.

A description of dynamic testing and the various values is given in Chapter 1 of the "Viscoelastic Properties Of Polymers," by Ferry published in 1961 by Wiley.

"A Rheological Study of Long Branching in Polyethylene by Blending" by Jacovic et al is published in J. Appl. Pol. Sci. 23, 517–527 (1979) is a relevant reference, a copy of which is added to the file.

The J' values can be corrected (reduced) by applying the usual statistical rubber elasticity correction to obtain J'r values. For example, J'r=J'×(T/Tr) where r is the reference temperature, T and Tr are in degree Kelvin, and in this Example Tr is 463° K. (190° C.) and T is 503° K. (230° C.)

In FIG. 1, a series of curves is shown for the J' values as a function of the oscillatory frequency ($\omega$) ranging from 0.1 to 500 radians/second (rps) at 463° K., for the solution recovered reference polymers and blends thereof. Superimposed on the curves are the J'r values shifted to 463° K. using the usual horizontal time-temperature superposition principal. A reference to temperature reduction and shifting is given in Chapter 11 of the previously cited reference book and Chapter 3 of Polymer Rheology, L. E. Nielson, published by Dekker, N.Y. 1977.

Figure 2:
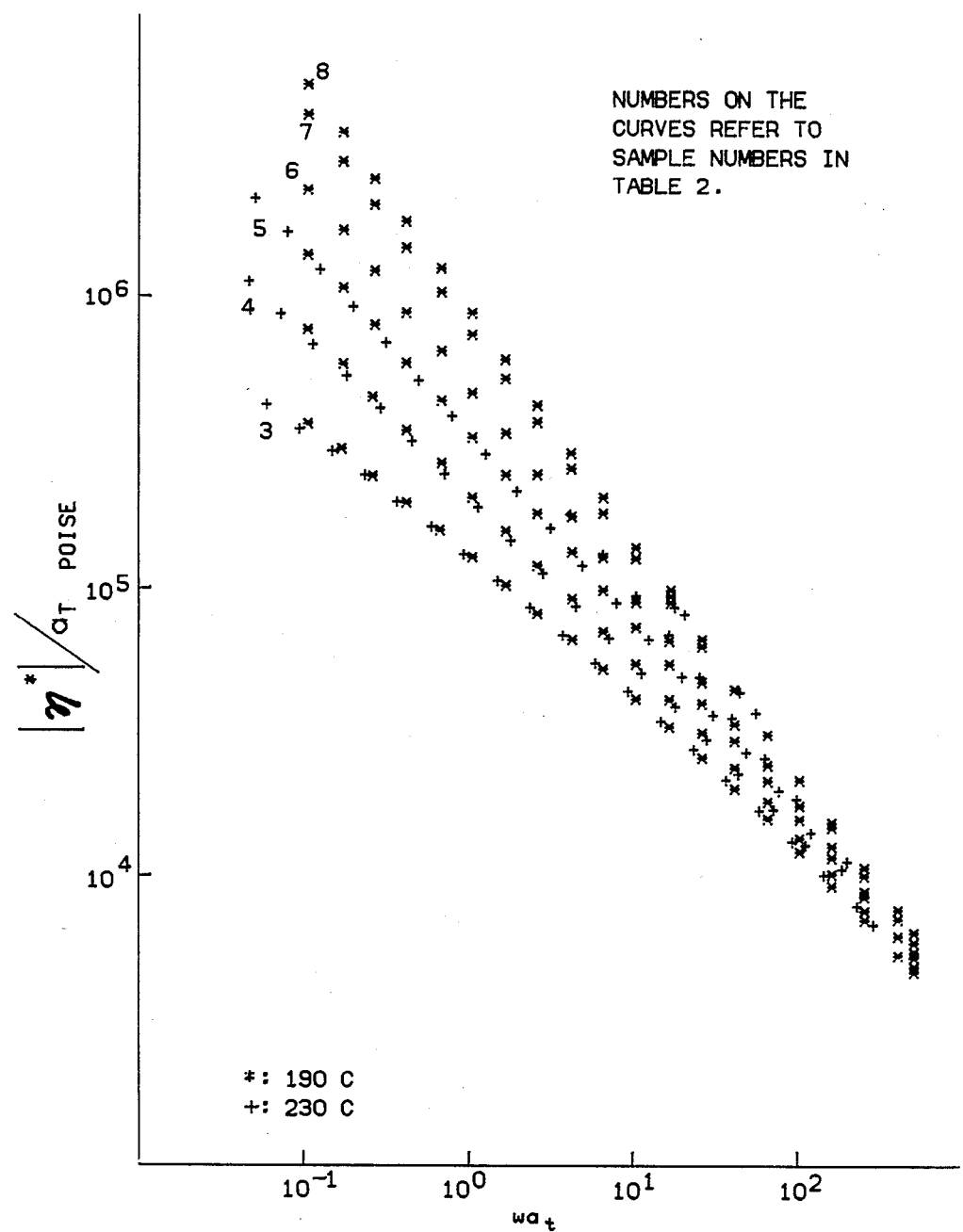
FIG. 2 is a graphical representation of rheological characteristics of certain of the invention solution recovered polymer blends.

As the curves in FIGS. 1 and 2 show, the storage compliance J', and viscosity, $/\eta^*/$respond quite well to branching, especially at low frequencies, e.g. 0.1 radians/second. The degree of this enhancement is believed to be novel and related to LCB since the weight average molecular weights of the samples is approximately constant as the data in Table 3 indicate.

Temperature shift factor, $A_T$, can be determined by superimposing the J'r values at 503° K. on the Jr' values at 463° K. The $A_T$ values are the fractional horizontal frequency factors needed to obtain superposition of the curves at different temperatures. For example, if $A_T$=0.5, multiplying all the 503° K. frequencies by 0.5 and replotting would cause superposition with the 463° K. data.

From $A_T$, the flow activation energy E* can be calculated from the equation:

$$E^* = \frac{R \ln (A_T)}{\frac{1}{T} - \frac{1}{T_o}}$$

wherein the value of E* is in calories/mole which can be divided by 1000 to give E* in terms of kcal/mole, R is the gas constant (1.987 calories per degree per mole), $A_T$ is the shift factor, T is 503° K. and $T_o$ is 463° K. in this case.

The polymer compositions tested and results obtained are presented in Table 4. The complex dynamic viscosity, $/\eta^*/$ divided by the temperature shift factor, $A_T$, as a function of the oscillatory frequency, $\omega$, in radians/second (rps) for the solution recovered reference polymers and blends thereof, is shown in the curves in FIG. 2. The variation of viscosity and flow activation energy as a function of LCB is given in FIG. 3.

In Table 4, it is evident that the temperature shift factors, $A_T$, calculated from either Jr' or the loss modulus Gr" (after application of the usual statistical rubber elasticity theory correction) are in good agreement and are very sensitive to sample composition. For example, with sample 4, having 2.4 LCB per 10,000 C, the temperature shift factors derived from J'r and G"r are 0.339 and 0.358, respectively. With sample 7, having 6.0 LCB per 10,000 C, the shift factors (same order as before) are 0.084 and 0.099 respectively. shifting /η*/ without the rubber elasticity correction requires slightly smaller shifts as expected.

The last column in Table 4 gives the calculated flow activation energies in kcal/mole as derived from J'r.

Solution recovery techniques can slightly enhance the melt viscosity of polyethylene in general if the presolution ("as received") state is characterized by poor entanglement efficiency, such as might occur as a result of extrusion. However, in these samples, the effect of solution recovery is small. Compare sample 2 and sample 8 in Table 4 for example. Both the viscosity and E* values are nearly identical. Comparing samples 1 and 3 shows that for the HDPE material, solution recovery did yield a slight increase in low shear rate viscosity, but no change in E*. These results indicate that the unique rheological behavior of this "Y" polymer and blends with HDPE is not limited to solution formed blends.

FIG. 2 shows the curves obtained by plotting /η*/ divided by $A_T$ vs shifted oscillatory frequency. The curves are in agreement with those of FIG. 1 and points out the unexpectedly dramatic enhancement in dynamic viscosity as LCB increases especially at low oscillatory frequencies.

FIG. 3 shows that viscosity enhancement occurs smoothly from about 1 to 7.2 LCB per 10,000 C atoms, the maximum number available in the Y-branched polymer employed.

FIG. 3 also shows that the dependence of flow activation energy (E*) on LCB is affected by the level of LCB, the higher the LCB level the higher the E*. Surprisingly, however, a plateau in E* is noted when the LCB level varied from about 2 to about 5 per 10,000 C atoms even though polymer viscosity enhancement is occurring in this region. Since E* is a measure of the temperature sensitivity, there is a range of invention blends shown as indicated above, which are relatively insensitive to changes in temperature. This plateau is at E* values near that typically reported for highly branched polyethylene (LDPE) with higher LCB concentrations (30 LCB/10,000 C atoms). Our polymer system obtains this same temperature sensitivity with only 2-5 LCB/10,000 C atoms. In addition, at 5-7 LCB/10,000, C atoms, E* values increase to greater than 20, which has never been achieved previously.

We claim:

1. A composition comprising a blend of
(a) a first polymer selected from normally solid crystalline ethylene homopolymers and copolymers of ethylene containing up to about 20 mole percent of at least one comonomer selected from α-olefins having from about 3 to about 20 carbon atoms, said polymer having repeating units of the structure —CH₂— and a density greater than about 0.95 g/cm³, and
(b) a second polymer selected from the group consisting of
 (1) non-gelled, normally solid crystalline ethylene homopolymers having repeating units of the structure —CH₂— and at least about two long chain Y-branches per 10,000 carbon atoms and fewer than about 10 short chain branches per 10,000 carbon atoms;
 (2) non-gelled, normally solid crystalline ethylene homopolymers and copolymers of ethylene containing up to about 20 mole percent of at least one comonomer selected from α-olefins having from about 3 to about 20 carbon atoms, having repeating units of the structure —CH₂— and a g value of less than about 0.9 and an intrinsic viscosity of less than about 3.0;
 (3) non-gelled, normally solid crystalline ethylene homopolymers and copolymers of ethylene containing up to about 20 mole percent of at least one comonomer selected from α-olefins having from about 3 to about 20 carbon atoms, having repeating units of the structure —CH₂— and comprising molecules exhibiting a numerical excess of long chain Y-branching over short chain branching; and
 (4) non-gelled, normally solid crystalline ethylene homopolymers and copolymers of ethylene containing up to about 20 mole percent of at least one comonomer selected from α-olefins having from about 3 to about 20 carbon atoms, having repeating units of the structure —CH₂— and comprising molecules having at least 2 long chain Y-branches per 10,000 carbon atoms and flow activation energy E* greater than 20 kcal/mole.

2. The composition of claim 1 in which the second ethylene polymer has more than about 5 long chain Y-branches per 10,000 carbon atoms.

TABLE 4

RHEOLOGICAL BEHAVIOR OF COMPONENTS AND BLENDS

| Sample Number | Calculated LCB per 10,000-C | Y-Branch Polymer Weight % | 190° at ω = 0.1 rps |η*| × 10⁻⁵ poise | tan δ | ω = 500 rps J' × 10⁷ cm²/dyne | 190°–230° C. $a_T$ (J'r)[3] | (G"r)[3] | |η*| | E* kcal/mole E[4] |
|---|---|---|---|---|---|---|---|---|---|
| 1 | 1.5 | 0[1] | 2.69 | 1.66 | 3.39 | .503 | .512 | .6117 | .95 |
| 2 | 7.2 | 100[1] | 52 | .47 | 2.78 | .039 | .035 | .063 | 37.6 |
| 3 | 1.5 | 0[2] | 3.70 | 1.21 | 3.44 | .500 | .477 | .568 | 8.02 |
| 4 | 2.4 | 20[2] | 7.68 | .84 | 3.44 | .339 | .358 | .431 | 12.5 |
| 5 | 3.6 | 40[2] | 14.5 | .69 | 3.28 | .370 | .390 | .472 | 11.5 |
| 6 | 4.8 | 60[2] | 23.8 | .56 | 3.24 | .306 | .332 | .391 | 13.7 |
| 7 | 6.0 | 80[2] | 42.0 | .44 | 2.82 | .084 | .099 | .108 | 28.7 |
| 8 | 7.2 | 100[2] | 53 | .41 | 3.10 | .028 | .037 | .040 | 41.3 |

[1]Tested in "as received" condition
[2]Recovered from solution
[3]Subscript r refers to use of the rubber elasticity theory correction. |η*| is not treated in this manner. The shift factors are derived from J'r, G"r and |η*|.
[4]E* is derived from J'r.

3. The composition of claim 1 in which the second ethylene polymer constitutes at least about 10 weight percent of the blend.

4. The composition of claim 1 in which the second ethylene polymer comprises molecules having about 7 to about 50 long chain Y-branches per 10,000 carbon atoms.

5. The composition of claim 1 in which the first ethylene polymer is an ethylene homopolymer having a density of at least about 0.95 and fewer than about 2 long chain Y-branches per 10,000 carbon atoms.

6. The composition of claim 1 in which the second ethylene polymer is a product of a non-gelling gamma irradiation of polyethylene in the melt in vacuo, the polyethylene having a density of at least about 0.95.

7. The composition of claim 6 in which the resulting blend has from about 1 to about 7 long chain branches per 10,000 carbon atoms.

8. The composition of claim 6 in which the second ethylene polymer constitutes from about 18 to about 60 weight percent of the blend.

9. The composition of claim 6 having an average of about 2 to about 5 long chain branches per 10,000 carbon atoms and a flow activation energy of at least about 12.

10. The composition of claim 6 having a flow activation energy of at least about 20.

11. The composition of claim 6 which is a product of extrusion blending the first and second polymers.

12. The composition of claim 6 in which the weight average molecular weights of the first and second polymers are within the range of about 120,000 to about 160,000.

13. The composition of claim 6 which is a product of solution blending the first and second polymers.

14. In a polymer extrusion process in which a polymer selected from ethylene homopolymers and copolymers having a density greater than about 0.95 g/cm$^3$ is extruded in the melt and the extruded polymer is cooled to produce a solid polymer, a process comprising
prior to or during extrusion of the polymer, exposing a portion of the polymer in the melt to radiation under non-gelling, non-oxidizing conditions, wherein the extruded product comprises a mixture of high density ethylene polymer and Y-branched ethylene polymer.

15. The process of claim 14 in which the irradiation is carried out in vacuo.

16. The process of claim 14 in which the irradiation is carried out at a temperature in the range of about 130° C. to about 300° C.

17. The process of claim 15 in which the irradiation is carried out at a temperature of about 200° C. to about 280° C.

18. The process of claim 14 in which the irradiation is provided in the form of gamma rays in a dose of about 0.1 MRad to about 4 MRad.

19. The process of claim 18 in which the irradiation is carried out by exposing a moving polymer mass to intermittent radiation.

20. The process of claim 14 in which the heating of the polymer is carried out under conditions of temperature and time effective for increasing vinyl end group unsaturation in the polymer.

21. The method of claim 14 in which the irradiation step is performed under conditions effective for formation of long chain Y-branched molecules.

22. A method for increasing the activation energy $E^*$ of a first polymer selected from ethylene homopolymers and copolymers having an activation energy $E^*$ of less than about 20 kcal/mole, the method comprising
blending the first polymer with a second polymer selected from ethylene homopolymers and copolymers and further selected from (a) polymers having, in the non-gelled state, at least about 2 long chain Y-branches and fewer than about 10 short chain branches per 10,000 carbon atoms, and (b) polymers having a numerical excess of long chain Y-branches as compared with short chain branches and an intrinsic viscosity of less than about 3.0.

23. The method of claim 22 in which the blending is carried out by passing the first and second polymers through an extruder.

24. The method of claim 22 in which the blending is carried out by dissolving each of the first and second polymers in a common solvent and recovering the polymers as a solid from the solvent.

25. The method of claim 22 in which the first polymer has a density of at least about 0.95 g/ml and the second polymer has at least about 5 long chain Y-branches per 10,000 carbon atoms.

26. The method of claim 22 in which the second polymer is a product of the irradiation of a sample of the first polymer in the melt under non-gelling vacuum conditions.

27. The method of claim 28 in which the second polymer and the first polymer are blended by passing the first and second polymers in the melt through an extruder simultaneously to produce an extrusion product.

28. The method of claim 29 in which the extrusion product is passed in the melt to a blow molding zone and is converted to a molded article.

29. The method of claim 24 in which the activation energy of the second polymer is at least about 35 kcal/mole.

30. The method of claim 24 in which the second polymer is present in the blend of the first and second polymers in an amount of at least about 5 weight percent of the blend.

31. The method of claim 32 in which the second polymer is present in the blend in an amount of about 18 to about 60 weight percent.

32. A blow molding composition prepared by the process of blending
(a) a first polymer selected from normally solid crystalline ethylene homopolymers and copolymers of ethylene containing up to about 20 mole percent of at least one comonomer selected from α-olefins having from about 3 to about 20 carbon atoms, having repeating units of the structure —$CH_2$— and a density greater than about 0.95 g/cm$^3$ and
(b) a second polymer selected from the group consisting of
  (1) non-gelled, normally solid crystalline ethylene homopolymers having repeating units of the structure —$CH_2$— and at least about two long chain Y-branches per 10,000 carbon atoms and fewer than about 10 short chain branches per 10,000 carbon atoms;
  (2) non-gelled, normally solid crystalline ethylene homopolymers and copolymers of ethylene containing up to about 20 mole percent of at least one comonomer selected from α-olefins having from about 3 to about 20 carbon atoms, having repeating units of the structure —CH$_2$— and a g value of less than about 0.9 and an intrinsic viscosity of less than about 3.0;

(3) non-gelled, normally solid crystalline ethylene homopolymers and copolymers of ethylene containing up to about 20 mole percent of at least one comonomer selected from α-olefins having from about 3 to about 20 carbon atoms, having repeating units of the structure —CH$_2$— and comprising molecules exhibiting a numerical excess of long chain Y-branching over short chain branching; and (4) non-gelled, normally solid crystalline ethylene homopolymers and copolymers of ethylene containing up to about 20 mole percent of at least one comonomer selected from α-olefins having from about 3 to about 20 carbon atoms, having repeating units of the structure —CH$_2$— and comprising molecules having at least 2 long chain Y-branches per 10,000 carbon atoms and flow activation energy E* greater than 20 kcal/mole.

33. An article prepared by molding the composition of claim 32.

34. An article prepared by blow molding the composition of claim 32.

35. A composition comprising a blend of
(a) a first polymer selected from normally solid crystalline ethylene homopolymers and copolymers of ethylene containing up to about 20 mole percent of at least one comonomer selected from α-olefins having from about 3 to about 20 carbon atoms, having repeating units of the structure —CH$_2$— and a density greater than about 0.95 g/cm$^3$, and
(b) a second polymer selected from non-gelled, normally solid crystalline ethylene homopolymers having repeating units of the structure —CH$_2$— and at least about two long chain Y-branches per 10,000 carbon atoms and fewer than about 10 short chain branches per 10,000 carbon atoms.

36. A composition comprising a blend of
(a) a first polymer selected from normally solid crystalline ethylene homopolymers and copolymers of ethylene containing up to about 20 mole percent of at least one comonomer selected from α-olefins having from about 3 to about 20 carbon atoms, having repeating units of the structure —CH$_2$— and a density greater than about 0.95 g/cm$^3$, and
(b) a second polymer selected from non-gelled, normally solid crystalline ethylene homopolymers and copolymers of ethylene containing up to about 20 mole percent of at least one comonomer selected from α-olefins having from about 3 to 20 carbon atoms, having repeating units of the structure —CH$_2$— and g value of less than about 0.9 and an intrinsic viscosity of less than about 3.0.

37. A composition comprising a blend of
(a) a first polymer selected from normally solid crystalline ethylene homopolymers and copolymers of ethylene containing up to about 20 mole percent of at least one comonomer selected from α-olefins having from about 3 to about 20 carbon atoms, having repeating units of the structure —CH$_2$— and a density greater than about 0.95 g/cm$^3$, and
(b) a second polymer selected from non-gelled, normally solid crystalline ethylene homopolymers and copolymers of ethylene containing up to about 20 mole percent of at least one comonomer selected from α-olefins having from about 3 to about 20 carbon atoms, having repeating units of the structure —CH$_2$— and comprising molecules exhibiting a numerical excess of long chain Y-branching over short chain branching.

38. A composition comprising a blend of
(a) a first polymer selected from normally solid crystalline ethylene homopolymers and copolymers of ethylene containing up to about 20 mole percent of at least one comonomer selected from α-olefins having from about 3 to about 20 carbon atoms, having repeating units of the structure —CH$_2$— and a density greater than about 0.95 g/cm$^3$, and
(b) a second polymer selected from non-gelled, normally solid crystalline ethylene homopolymers and copolymers of ethylene containing up to about 20 mole percent of at least one comonomer selected from α-olefins having from about 3 to about 20 carbon atoms, having repeating units of the structure —CH$_2$— and comprising molecules having at least 2 long chain Y-branches per 10,000 carbon atoms and flow activation energy E* of greater than 20 kcal/mole.

39. The composition of claim 36 in which the second polymer has at least 2 long chain Y-branches per 10,000 carbon atoms.

40. The composition of claim 37 in which the second polymer has at least 2 long chain Y-branches per 10,000 carbon atoms.

41. A composition comprising a blend of
(a) a first polymer selected from normally solid ethylene homopolymers and copolymers of ethylene containing up to about 20 mole percent of at least one comonomer selected from α-olefins having from about 3 to about 20 carbon atoms, said polymer having repeating units of the structure —CH$_2$— and
(b) a second polymer selected from non-gelled, normally solid crystalline ethylene homopolymer and copolymers of ethylene containing up to about 20 mole percent of at least one comonomer selected from α-olefins having 3 to about 20 carbon atoms, having repeating units of the structure —CH$_2$— and a flow activation energy greater than 20 kcal/mole.

* * * * *